United States Patent
Noble

[19]

[11] Patent Number: 5,915,735
[45] Date of Patent: Jun. 29, 1999

[54] REPOSITIONABLE FLEXIBLE DOWNSPOUT EXTENSION

[75] Inventor: Christopher D. Noble, Matthews, N.C.

[73] Assignee: Gutter World, Inc., Atlanta, Ga.

[21] Appl. No.: 09/145,117

[22] Filed: Sep. 2, 1998

Related U.S. Application Data

[63] Continuation of application No. 08/610,588, Mar. 7, 1996, Pat. No. 5,813,701.

[51] Int. Cl.$^6$ .............................. F16L 11/06; F16L 41/00
[52] U.S. Cl. .............................. 285/4; 285/903; 285/226; 285/184; 138/119; 52/16; 137/615
[58] Field of Search ...................................... 239/197, 208, 239/269; 285/3, 4, 903, 226, 299, 184, 183, 227; 52/16; 137/615; 138/119

[56] References Cited

U.S. PATENT DOCUMENTS

| | | |
|---|---|---|
| 2,814,529 | 11/1957 | Arnt . |
| 3,076,669 | 2/1963 | Schlein . |
| 3,623,500 | 11/1971 | Hoy . |
| 3,695,643 | 10/1972 | Schmunk . |
| 3,825,288 | 7/1974 | Maroschak . |
| 3,861,419 | 1/1975 | Johnson . |
| 3,873,137 | 3/1975 | Yamaguchi . |
| 3,911,954 | 10/1975 | Johnson . |
| 3,929,165 | 12/1975 | Diebolt et al. . |
| 3,958,425 | 5/1976 | Maroschak . |
| 3,966,121 | 6/1976 | Littman . |
| 4,650,224 | 3/1987 | Smith . |
| 4,810,008 | 3/1989 | Brodie . |
| 4,953,897 | 9/1990 | Klöber . |
| 5,358,006 | 10/1994 | Sweers . |
| 5,375,891 | 12/1994 | Sicotte et al. . |
| 5,395,278 | 3/1995 | Dickhut . |
| 5,511,829 | 4/1996 | Sicotte et al. . |

FOREIGN PATENT DOCUMENTS

| | | |
|---|---|---|
| 1247652 | 10/1960 | France . |
| 43126 | 4/1977 | Japan . |
| 6126 | 1/1979 | Japan . |
| 426180 | 6/1967 | Switzerland . |
| 1557645 | 1/1980 | United Kingdom . |
| 1584365 | 2/1981 | United Kingdom . |

*Primary Examiner*—Eric K. Nicholson
*Attorney, Agent, or Firm*—Jones & Askew, LLP

[57] ABSTRACT

A repositionable downspout extension that is attached to a downspout to direct rainwater away from a building. The extension is a generally cylindrical body with first and second ends. The extension comprises selectively removable adapter portions at each end that allow the extension to be connected to a downspout. An interlockable collar portion is at each end of the extension and interior to the adapter portions. The interlockable collar portions allow a number of the extensions to be connected together to form a downspout extension assembly after the adapter portions are removed. The extension further comprises an adjustable portion between the two collar portions. The adjustable portion comprises collapsible corrugations so that the extension can be bent into a number of positions and hold its position.

14 Claims, 7 Drawing Sheets

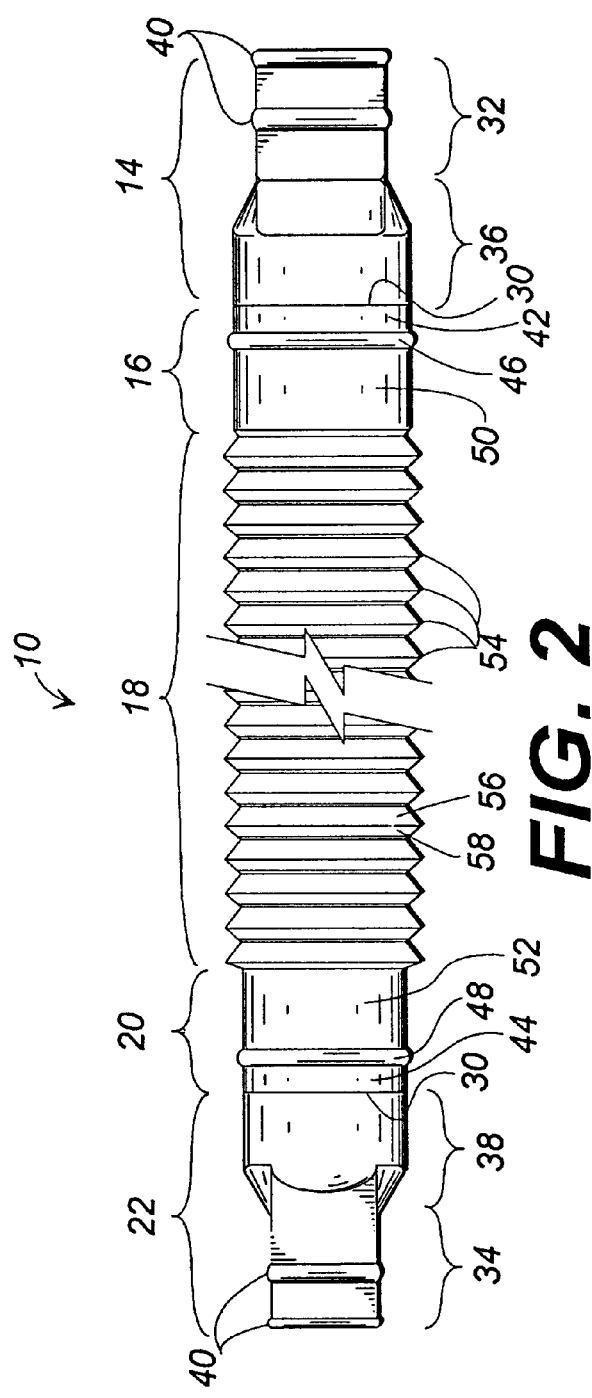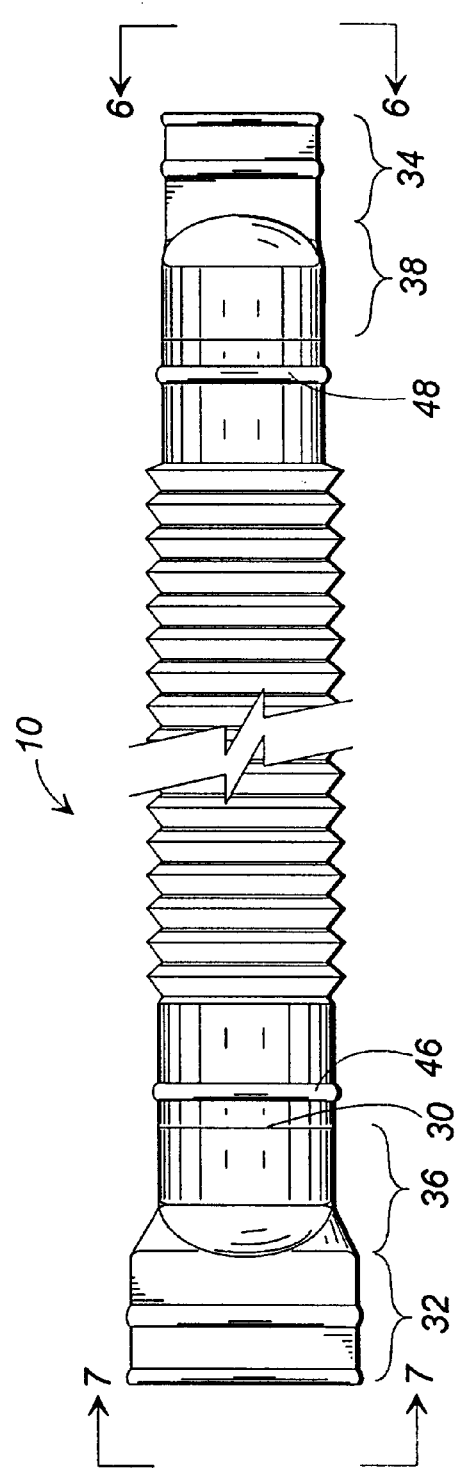

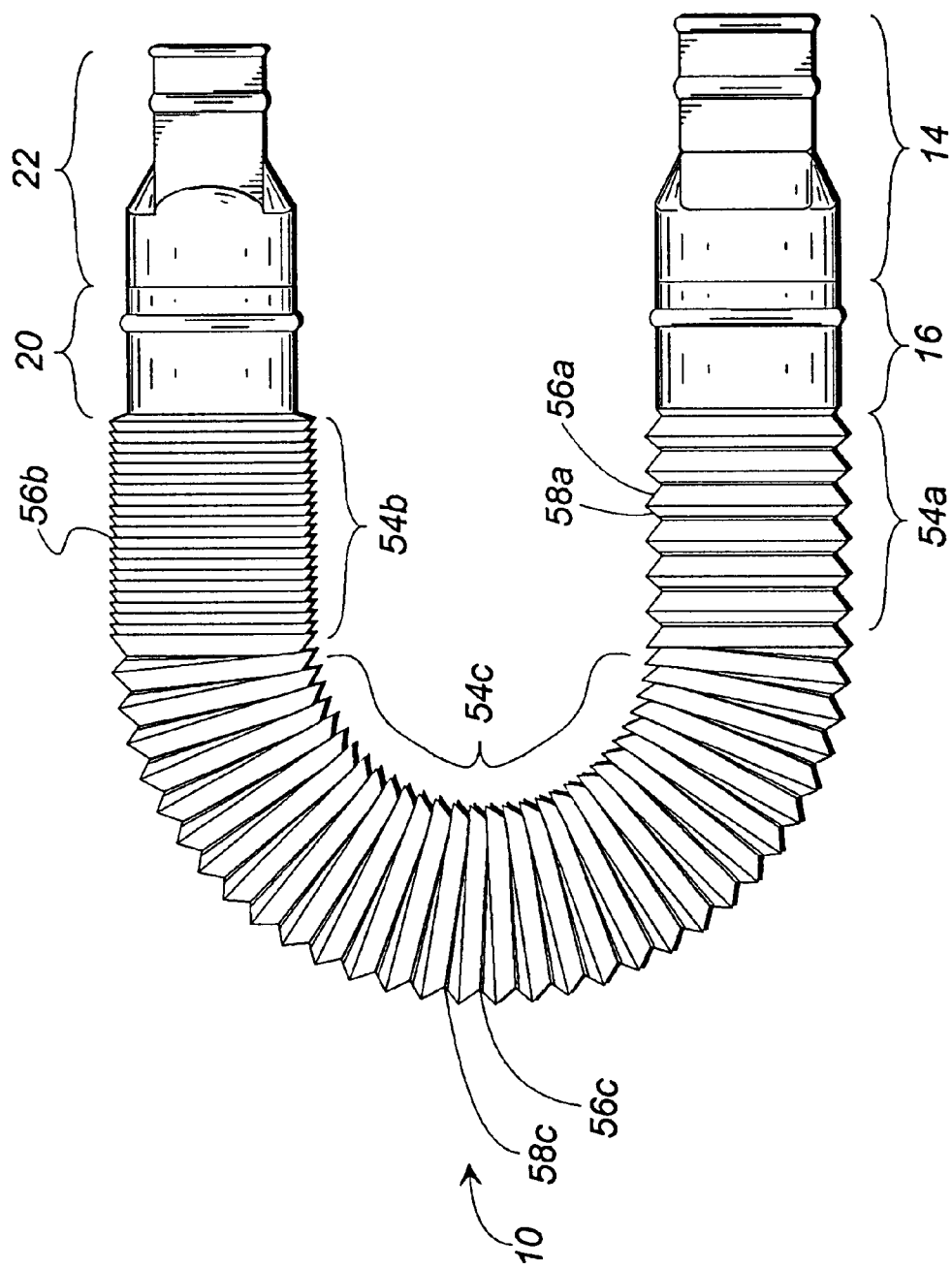

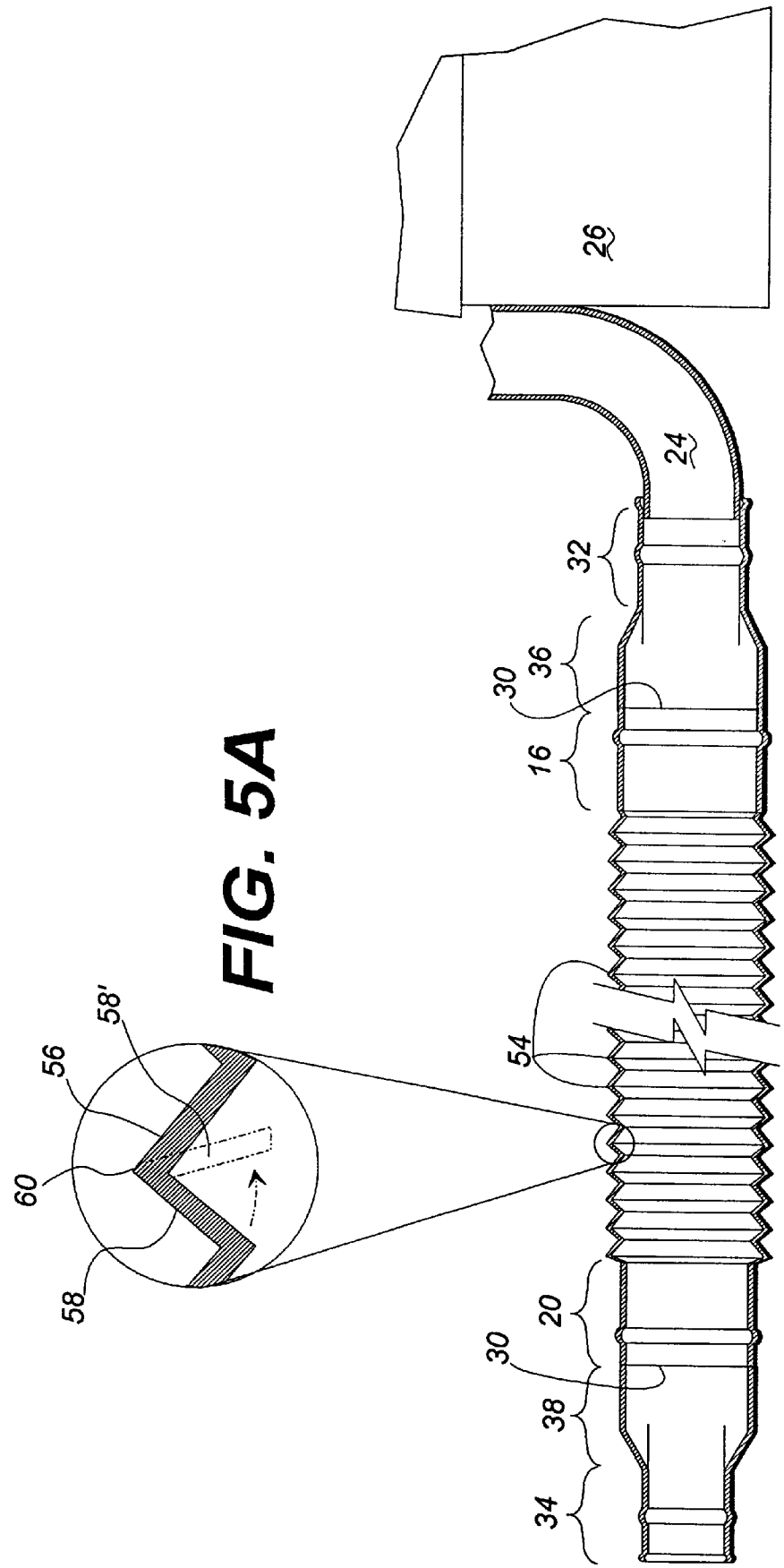

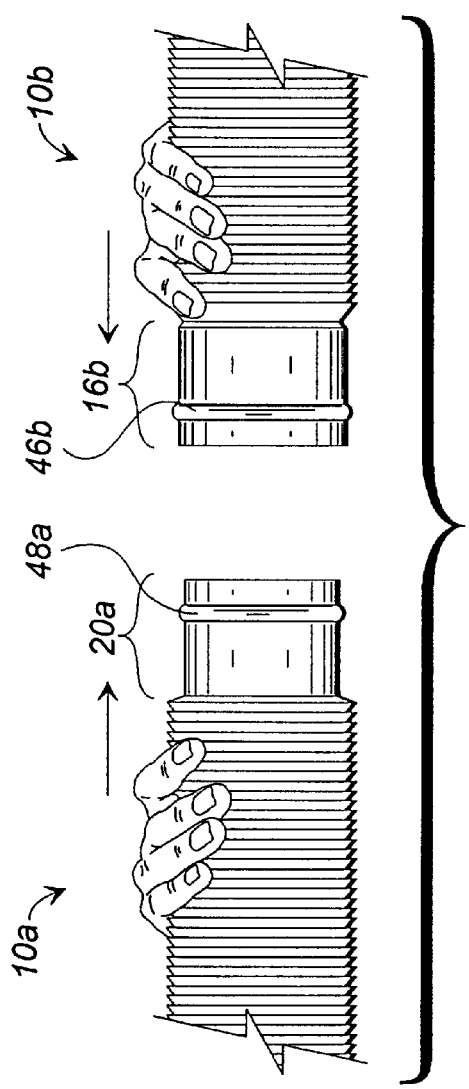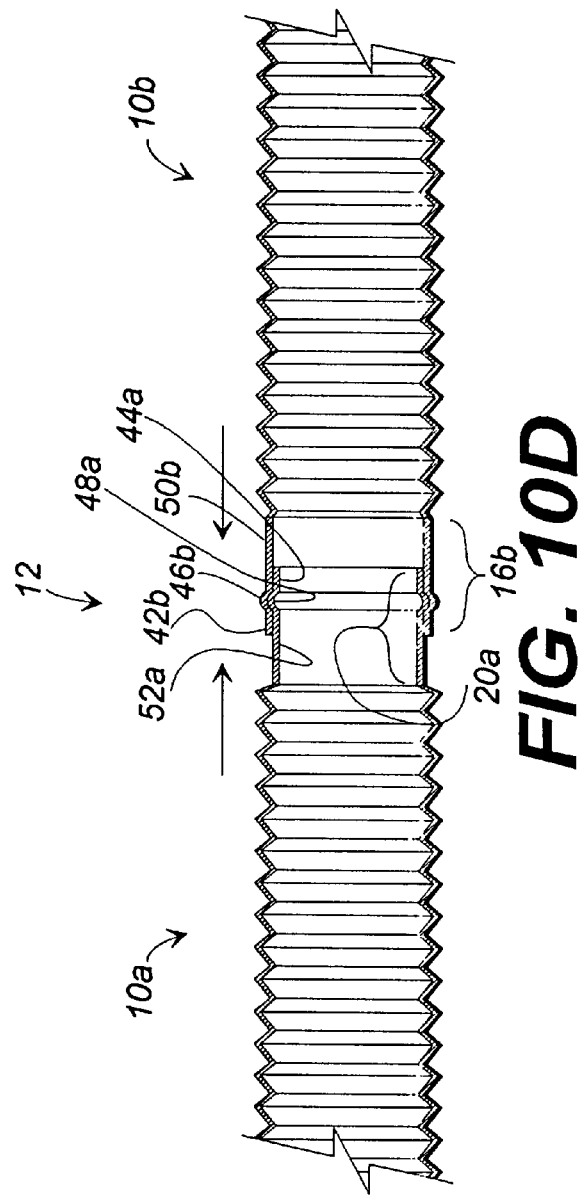

REPOSITIONABLE FLEXIBLE DOWNSPOUT EXTENSION

CROSS REFERENCE TO RELATED APPLICATION

This application is a continuation of U.S. patent application Ser. No. 08/610,588 filed on Mar. 7, 1996, entitled REPOSITIONABLE FLEXIBLE DOWNSPOUT EXTENSION, now U.S. Pat. No. 5,813,701.

FIELD OF THE INVENTION

The present invention relates to gutter downspouts, and in particular relates to an apparatus particularly designed to attach to a downspout to provide a flexible, extendible, interlocking channel for rainwater to be funneled away from a building.

BACKGROUND OF THE INVENTION

For many years, buildings have been equipped with gutters and downspouts for removing water from their roofs and away from their foundations. Typically, the gutters of a building are connected to a number of downspouts. The gutters are usually at a slight incline in the direction of the downspouts so that the force of gravity will cause the rainwater to travel down the incline, through the downspout and exit the opening of the downspout. The inclined gutters are designed so that water does not collect in any one place in the gutters.

A problem of known gutter systems is that the elbow of the downspout only directs water a short distance away from the building. Because of this short distance, water is often exhausted too close to the basement of the building causing the foundation to crack or leak. Another piece of downspout extending on the ground away from the building can be connected to the elbow to exhaust the water further away from the building. However, adding another piece of downspout has several drawbacks. One drawback is that the downspout can only be extended in the same linear direction of the elbow of the downspout because the downspout material is not flexible or bendable. Another drawback is that an extension of downspout material may have to be moved for lawn care or other reasons and the extension of downspout material can be cumbersome to move. Also, the downspout material may be expensive in comparison to other materials.

Attempts have been made in the art to provide a downspout extension that directs water away from a building without simply adding another piece of downspout material. Some examples of these attempts are the bendable, "corrugated" plastic pipes and adapters that are connected to a downspout. Other examples are described in the patents to Sweers (U.S. Pat. No. 5,358,006), Schlein (U.S. Pat. No. 3,076,669), and Johnson (U.S. Pat. No. 3,861,419).

Bendable, corrugated, plastic pipe extensions and adapters, such as supplied by Advanced Drainage Systems, Inc. of Montezuma, Ga., are known in the prior art. The adapter is connected to the downspout and then the bendable, corrugated plastic pipe is connected to the adapter. Although these corrugated, plastic pipe downspout extensions direct water away from the foundation of a building, they suffer from several drawbacks. One drawback of these corrugated, plastic pipe downspout extensions is that, although bendable, they will not hold their position. Thus, elbows are required when the user needs a turn in the downspout extensions. Another drawback is the number of parts required. These corrugated, plastic pipe downspout extensions with circular cross-sections require an adapter piece to connect to the rectangular cross-sectional downspout and elbows where a turn in the extension is needed. Another drawback of these corrugated, plastic pipe downspout extensions is their fixed length. The user may need a downspout extension of a greater or lesser length than the fixed length provided.

Sweers, U.S. Pat. No. 5,358,006, describes an adjustable extension assembly for a downspout that includes a fixed piece attachable to the lowermost end of a downspout, a rotatable collar attached to the fixed piece, and at least one extension pivotably attached to the rotatable collar. The assembly described by Sweers can be pointed in different directions and the assembly can be extended to different lengths. However, one of the drawbacks of Sweers is that the assembly can point only linearly and can not bend around objects.

Schlein, U.S. Pat. No. 3,076,669, describes a plastic bellows elbow with spigot and socket ends. The device is configured for connecting an eaves trough to a downspout. The elbow comprises plastic having limited flexibility and a tendency to cold flow to a predetermined set under sustained pressure and having an elastic memory. The intermediate portion of the coupling is described as being provided with a "bellows formation" that provides a certain degree of flexibility, allowing it to be bent in any direction and expand and contract. However, the bellows in Schlein will not hold its position.

Johnson, U.S. Pat. No. 3,861,419, describes a hinged extension for downspouts. The hinge allows the downspout extension to be selectively disengaged from the downspout so that the extension can be pivoted to provide clearance for routine yard work. However, the hinged extension described by Johnson is not bendable or flexible and only points in the same direction as the downspout.

The prior art does not satisfy the need for a downspout extension that is inexpensive, flexible, extendible, locks into place, holds its position, requires few parts, and is interlocking to form a downspout extension assembly. The needs outlined above led to the present invention.

SUMMARY OF THE PRESENT INVENTION

The present invention seeks to provide a downspout extension that is inexpensive, flexible, extendible, locks into place, holds its position, requires few parts and is interlocking to form a downspout extension assembly.

Briefly described, the present invention provides a repositionable gutter downspout extension. The present invention includes an elongate generally cylindrical body with first and second ends. The body includes collapsible corrugations and connectors affixed at each end of the body. The connectors allow the extension to be connected to a downspout. The invention can be fabricated as one piece by extrusion of plastic.

The connector at the first end can be manufactured with a larger cross-sectional area than the connector at the second end. The connector at the first end fits one standard gutter size and the connector at the second end fits another standard gutter size. According to another aspect of the invention, the connector at the first end of one downspout extension can be connected to the connector at the second end of another downspout extension to form a downspout extension assembly.

More particularly described, the present invention provides a repositionable gutter downspout extension that includes an elongate generally cylindrical body with first and second ends. The body comprises a plurality of collapsible corrugations, a locking means, and connectors at the first and second ends.

According to one aspect of the invention, each collapsible corrugation of the plurality of corrugations has a static side and a movable side. The downspout extension can be extended by manually pulling the movable sides away from the static sides until the movable sides lock into an extended position. The downspout extension can be compressed by pushing the movable sides towards the static sides until the movable sides lock into a compressed position.

In a preferred embodiment, the present invention is an elongate generally cylindrical body with first and second ends. The body includes a first selectively removable adapter portion at the first end. The first selectively removable adapter portion extends inwardly to a first cutline. Axially interior to the first cutline is a first interlockable collar portion. An adjustable portion is located between the first interlockable collar portion and a second interlockable collar portion. The second interlockable collar portion extends from the adjustable portion to a second cutline. Located at the second end of the body and adjacent the second cut line is a second selectively removable adapter portion.

Each of the selectively removable adapter portions in the preferred embodiment have a transition region and a rectangular gutter adapter portion. The rectangular gutter adapter portion is located at each end of said cylindrical body and has a generally rectangular cross-section. The rectangular gutter adapter portion of the first end of the body has a larger cross-section than the rectangular gutter adapter portion at the second end. The rectangular gutter adapter portions also include gripholds. One griphold is adjacent to each end of the cylindrical body. Another griphold is axially inward from each end of the cylindrical body. The gripholds are protuberances of generally rectangular cross-section that extend around the circumference of the rectangular gutter adapter portion. The cross-section of the protuberance is larger than the cross-section of the rectangular gutter adapter portion.

The transition regions of the preferred embodiment are located axially inward from the rectangular gutter adapter portions. The transition regions have a rectangular cross-section just inward of the rectangular gutter adapter portion and extend inward to a generally cylindrical shape and circular cross-section adjacent the cutlines.

The cutlines of the preferred embodiment of the present invention are indentations that extend around the circumference of the body. The cutlines have a cross-sectional thickness less than the cross-sectional thickness of the selectively removable adapter portions and interlockable collar portions.

The interlockable collar portions of the preferred embodiment include an outer collar, an inner collar and a locking rib. The outer collar is located axially inward of the cutline. The locking rib is located axially inward of the outer collar. The inner collar is located axially inward of the locking rib and adjacent to the adjustable portion. The outer and inner collars are cylindrical. The locking rib is a curved protuberance that extends around the circumference of the interlockable collar portion. The interlockable collar portion of the first end of the body has a slightly larger radius than the interlockable collar portion of the second end of the body. The locking rib of the interlockable collar portion of the first end is called a female locking rib and the locking rib of the interlockable collar portion of the second end is called a male locking rib.

The adjustable portion of the preferred embodiment of the present invention has a plurality of collapsible corrugations. Each collapsible corrugation has a frusto-conical static side and a frusto-conical movable side. The adjustable portion can be extended, compressed and locked in various shapes due to the collapsible corrugations.

In the preferred embodiment of the present invention, the cutlines facilitate removal of the selectively removable adapter portions. The cutlines have a thinner cross-sectional thickness than the surrounding body. Therefore, it is easier to cut off the selectively removable adapter portions. After removing the removable gutter adapter portions, the first collar portion of a first repositionable gutter downspout extension can be connected to the second collar portion of a second repositionable gutter downspout extension until the male locking rib of the second collar portion of the second repositionable gutter downspout extension locks into the female locking rib of the first collar portion of the first repositionable gutter downspout extension to hold the first gutter downspout extension to the second gutter downspout extension.

Therefore, it is an object of the present invention to provide a downspout extension that is flexible, extendible, locks into place, and holds its position.

It is a further object of the present invention to provide such an apparatus that is inexpensive and requires few parts.

It is a further object of the present invention to provide such an apparatus that will interlock to form a downspout extension assembly.

Other features and advantages of the present invention will be apparent to persons skilled in the art from the following detailed description of a preferred embodiment accompanied by the attached drawings wherein identical reference numerals will refer to like parts in the various views.

BRIEF DESCRIPTION OF THE DRAWINGS

FIG. 2 is a side view of a preferred embodiment of the present invention.

FIG. 3 is a top view of a preferred embodiment of the present invention.

FIG. 4 is a side view of a preferred embodiment of the present invention bent to demonstrate the flexibility of the present invention.

FIG. 5 is a side cross-sectional view of a preferred embodiment of the present invention attached to a downspout of a building.

FIG. 5A is an enlarged view of a collapsible corrugation of the downspout extension of FIG. 5.

FIG. 10C is a side view of two downspout extensions, 10a and 10b, being manually connected.

FIG. 10D is a side cross-sectional view of downspout extensions, 10a and 10b, connected together to form an extension assembly 12.

DETAILED DESCRIPTION OF THE PREFERRED EMBODIMENT

The preferred embodiment of the present invention is a plastic downspout extension that is connected to the end of a downspout to channel water away from the foundation of a building. A downspout extension in accordance with the preferred embodiment of the present invention is extendible and collapsible to different lengths, flexible to different positions, and lockable to hold its position. In addition, a number of the downspout extensions can be coupled together to form a downspout extension assembly.

Figure 1:
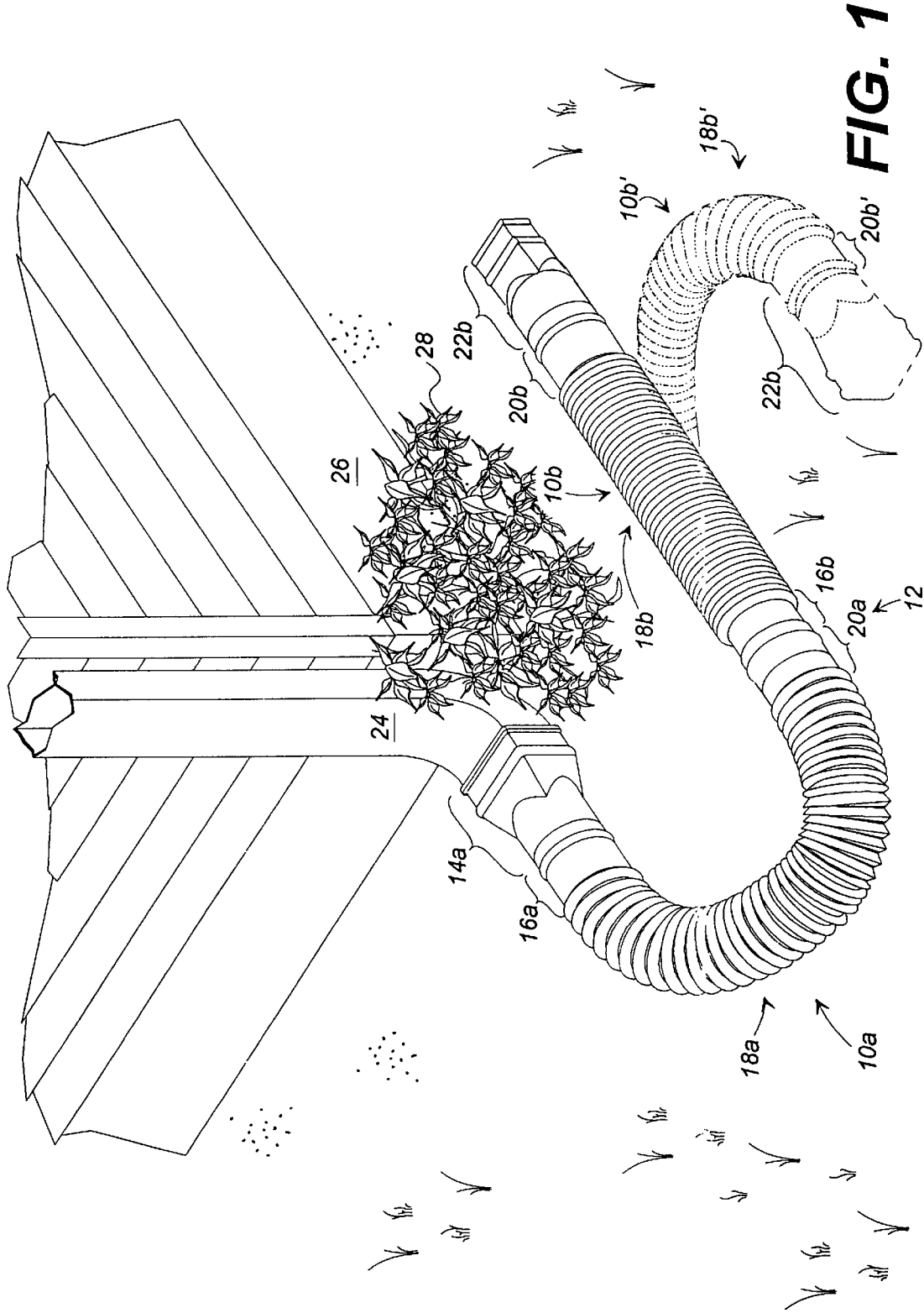
FIG. 1 is a perspective view of two interlocked repositionable flexible downspout extensions, 10a and 10b, of a preferred embodiment of the present invention attached to the downspout of a building.

Referring now to the drawings, in which like numerals refer to like elements throughout the several views, FIG. 1 shows a pair of downspout extensions, 10a and 10b, in accordance with the preferred embodiment of the present invention. Each downspout extension, 10a and 10b, is an elongate, generally cylindrical body comprising a first selectively removable adapter portion 14, a first interlockable collar portion 16, an adjustable portion 18, a second interlockable collar portion 20, and a second selectively removable adapter portion 22.

The second selectively removable adapter portion 22a of downspout extension 10a and the first selectively removable adapter portion 14b of downspout extension 10b are not shown in FIG. 1 because they have been removed so that the downspout extensions, 10a and 10b, could be coupled together to form extension assembly 12. Removal of the selectively removable adapter portions, 14b and 22a, and the connection of downspout extensions, 10a and 10b, will be more fully described in reference to FIGS. 10A–10D.

Still referring to FIG. 1, the downspout extension assembly 12 functions as follows. The first selectively removable adapter portion 14a of downspout extension 10a is connected to downspout 24 of building 26. Rainwater from the roof of building 26 flows down downspout 24, then flows through the downspout extensions, 10a and 10b, and out the end of second selectively removable adapter portion 22b. Downspout extension 10a is shown in FIG. 1 bent around bush 28 to demonstrate the flexibility of a downspout extension in accordance with the preferred embodiment of the present invention. A dashed-lined downspout extension 10b' is also shown in FIG. 1 to further demonstrate that downspout extension 10b is flexible and can be locked into different positions.

Referring now to FIG. 2, it will be seen that the preferred embodiment of the downspout extension 10 is a generally elongate cylindrical body. The elongate body comprises a first selectively removable adapter portion 14 and a first interlockable collar portion 16 located axially interior to the first selectively removable adapter portion 14. The downspout extension 10 further comprises an adjustable portion 18 located axially interior to the first interlockable collar portion 16. At the end of the adjustable portion 18 opposite to the first interlockable collar portion 16 is a second interlockable collar portion 20. Axially exterior to the second interlockable collar portion 20 is a second selectively removable adapter portion 22. Cutlines 30 separate the first selectively removable adapter portion 14 from the first interlockable collar portion 16 and the second selectively removable adapter portion 22 from the second interlockable collar portion 20.

The selectively removable adapter portions, 14 and 22, can be removed to facilitate the connection of two or more downspout extensions to form a downspout extension assembly 12 such as shown in FIG. 1. A description of forming a downspout extension assembly will be given in reference to FIGS. 10A–10D. Referring back to FIG. 2, each selectively removable adapter portion, 14 and 22, comprises a rectangular gutter adapter portion, 32 and 34, and a transition region, 36 and 38.

The rectangular gutter adapter portions, 32 and 34, are used to connect the downspout extension 10 to a downspout. Each rectangular gutter adapter portion, 32 and 34, is tubular and generally rectangular in cross-section. The cross-sectional area of first rectangular gutter adapter portion 32 is larger than the cross-sectional area of second rectangular gutter adapter portion 34. The rectangular gutter adapter portions, 32 and 34, are of different sizes so that the downspout extension 10 can fit standard downspouts of two different sizes. In the preferred embodiment, first rectangular gutter adapter portion 32 has a height of three inches and a width of four inches; and rectangular gutter adapter portion 34 has a height of two inches and a width of three inches. Connecting one of the rectangular gutter adapter portions, 32 or 34, to a downspout will be described in the following paragraph.

Still referring to FIG. 2, a griphold 40 is located at the end of each rectangular gutter adapter portion, 32 and 34, and axially interior to the end of each rectangular gutter adapter portion. The gripholds 40 are raised protuberances that extend circumferentially around the gutter adapter portions, 32 and 34. The gripholds 40 provide a convenient surface to grasp when connecting or disconnecting the rectangular gutter adapter portions, 32 and 34, to and from a downspout. By grasping the downspout extension 10 around the gripholds 40, the user can slide one of the rectangular gutter adapter portions, 32 or 34, around the end of a downspout to attach the downspout extension 10 to a downspout. Depending on the size of the downspout, either first rectangular gutter adapter portion 32 or second rectangular gutter adapter portion 34 is connected to the downspout.

Preferably, the downspout extension 10 also includes mounting holes (not shown) on the sides of the rectangular gutter adapter portions, 32 and 34, so that the downspout extension 10 can be fixably mounted to a downspout with suitable mounting means, such as screws, bolts or the like. Referring to FIG. 5, a side cross-sectional view of a downspout extension 10 attached to the downspout 24 of a building 26 is shown. As shown in FIG. 5, the first rectangular gutter adapter portion 32 is connected to downspout 24 demonstrating how the rectangular gutter adapter portions, 32 and 34, are slid around downspouts.

Referring back to FIG. 2, each selectively removable adapter portion, 14 and 22, also includes a transition region, 36 and 38. First transition region 36 is axially interior to first rectangular gutter adapter portion 32. Second transition region 38 is axially interior to second rectangular gutter adapter portion 34. Each transition region, 36 and 38, is a tubular body that extends from the rectangular gutter adapter portion, 32 and 34, axially inward to the cutlines 30. Each transition region, 36 and 38, has a generally circular cross section adjacent to the cutlines 30 and a generally rectangular cross section adjacent to the rectangular gutter adapter portions, 32 and 34. In between the cutlines 30 and the rectangular gutter adapter portions, 32 and 34, the cross-sections of the transition regions, 36 and 38, gradually change from circular to rectangular.

Referring now to FIG. 3, a top view of the selectively removable adapter portions, 14 and 22, and the interlockable collar portions, 16 and 20, at each end of the downspout extension 10 can be seen. The transition regions, 36 and 38, are shaded in FIG. 3 to more clearly show the transition from a generally circular cross section adjacent the cutlines 30 to a generally rectangular cross section adjacent the rectangular gutter adapter portions 32 and 34.

Referring back to FIG. 2, cutlines 30 separate the first selectively removable adapter portion 14 from the first interlockable collar portion 16 and the second selectively removable adapter portion 22 from the second interlockable collar portion 20. Each cutline 30 is an indentation that extends around the circumference of the downspout extension 10. The cutlines 30 have a cross-sectional thickness that is less than the cross-sectional thickness of the selectively removable adapter portions, 14 and 22, and the interlockable collar portions, 16 and 20, that are on either side of the cutlines. The thin cross-sectional thickness of the cutlines 30 facilitate the removal of the selectively removable adapter portions, 14 and 22, as will be more fully described with reference to FIGS. 10A–10D.

Still referring to FIG. 2 and turning now to the interlockable collar portions, 16 and 20, it will be seen that the interlockable collar portions are axially interior to the selectively removable adapter portions, 14 and 22. The interlockable collar portions, 16 and 20, are generally shaped like cylindrical tubes and each collar portion extends axially inward to the adjustable portion 18. Each interlockable collar portion, 16 and 20, includes an outer collar, 42 and 44, a locking rib, 46 and 48, and an inner collar, 50 and 52. Each outer collar, 42 and 44, is positioned adjacent to and axially interior to the selectively removable adapter portions, 14 and 22. Each locking rib, 46 and 48, is adjacent to and axially interior to the outer collar, 42 and 44. Each inner collar, 50 and 52, is adjacent to and axially interior to the locking ribs, 46 and 48.

The outer collars, 42 and 44, and inner collars, 50 and 52, are generally cylindrical in shape with a circular cross section. Each locking rib, 46 and 48, is a curved protuberance that extends circumferentially around the interlockable collar portion, 16 and 20. Each locking rib, 46 and 48, has a circular cross section that is larger than the cross-section of the outer collars, 42 and 44, and the inner collars, 50 and 52. Locking rib 46 is called a female locking rib and locking rib 48 is called a male locking rib.

Referring still to FIG. 2, the first interlockable collar portion 16 has a slightly larger cross-section than the cross-section of the second interlockable collar portion 20. That is, the cross-sections of outer collar 42 and inner collar 30 are larger than the cross-sections of outer collar 44 and inner collar 52. In addition, female locking rib 46 has a larger cross-section than male locking rib 48. The different-sized interlockable collar portions, 16 and 20, allow two downspout extensions to be coupled and held together to form a downspout extension assembly 12 such as is shown in FIG. 1. This extension assembly capability will be more fully described below in reference to FIGS. 10A–10D.

Referring back to FIG. 2, it will be seen that there is an adjustable portion 18 between the interlockable collar portions, 16 and 20. The adjustable portion 18 comprises a plurality of collapsible corrugations 54. The accordion-like collapsible corrugations 54 allow the downspout extension 10 to be extended or compressed to different lengths and allow the downspout extension 10 to be bent and held in different positions. Thus, the downspout extension 10 of the preferred embodiment of the present invention can be compressed and bent out of the way when necessary and can be bent to avoid certain objects. For example, referring back to FIG. 1, the downspout extension 10a is bent around bush 28. In addition, the downspout extension 10 shown in FIG. 4 is bent to show its flexibility and locking ability.

Referring again to FIG. 2, each collapsible corrugation 54 comprises a static side 56 and a movable side 58. The static side 56 and the movable side 58 each have a generally frusto-conical shape. As shown in FIG. 2, the movable side 58 of each collapsible corrugation 54 is as far apart from the static side 56 as possible. When the movable side 58 of a collapsible corrugation 54 is as far apart from the static side 56 as possible, the collapsible corrugation is in an extended state.

Referring now to FIG. 4, it will be seen that the collapsible corrugations 54 can be in an extended state, a compressed state or a halfway state. The collapsible corrugations 54a in FIG. 4 are in an extended state because the movable sides 58a are as far apart from the static sides 56a as possible. The collapsible corrugations 54b are in a compressed state because the movable sides 58b are as close to the static sides 56b as possible. The movable sides 58b of collapsible corrugations 54b are not visible in FIG. 4 because the collapsible corrugations 54b are in a compressed state. The collapsible corrugations 54c are in a halfway state, that is, part of each of the movable sides 58 is as close to the static sides 56 as possible and part of each of the movable sides is as far apart from the static side as possible.

Figure 6:
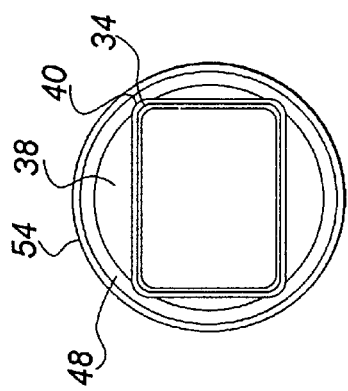
FIG. 6 is an end view of a preferred embodiment of the present invention looking along line 6—6 of FIG. 3.

Referring to FIG. 5A, an enlarged view of a collapsible corrugation 54 is shown. The static side 56 and movable side 58 meet at an apex 60. The movable side 58 pivots about this apex 60 to either an extended state or compressed state. In FIG. 5A, the movable side 58 is shown in an extended state and a dashed-line movable side 58' is shown in a compressed state Referring now to FIG. 6, a view of downspout extension 10 taken along line 6—6 of FIG. 3 is shown. The second rectangular gutter adapter portion 34 and the gripholds 40 are almost rectangular in the end view of FIG. 6. The second transition region 38, the male locking rib 48 and the collapsible corrugation 54 are also shown in FIG. 6.

Figure 7:
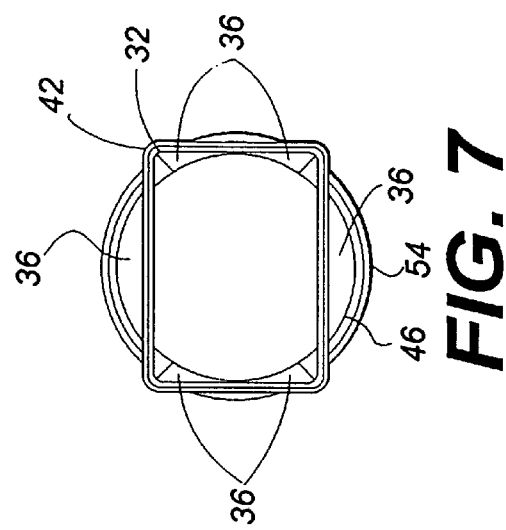
FIG. 7 is an end view of a preferred embodiment the present invention looking along line 7—7 of FIG. 3.

Referring now to FIG. 7, a view of downspout extension 10 taken along line 7—7 of FIG. 3 is shown. The first rectangular gutter adapter portion 32 and gripholds 40 are shown in FIG. 7. The rectangular to circular transition of first transition region 36 is also shown in FIG. 7. The female locking rib 46 and collapsible corrugation 54 can also be seen in FIG. 7.

Figure 8:
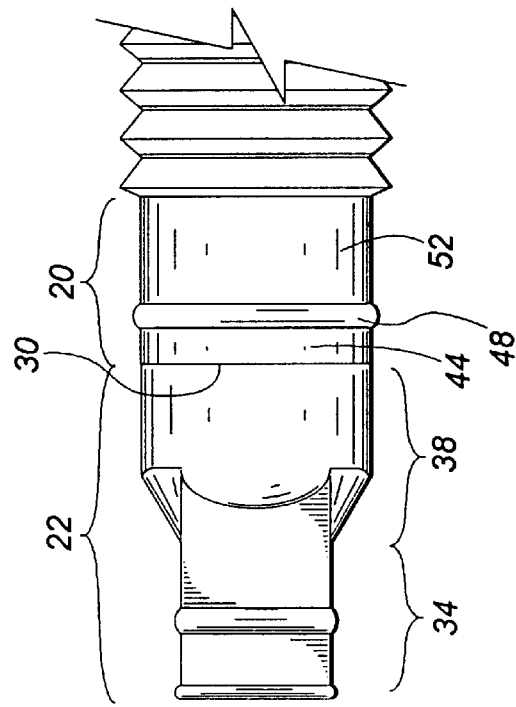
FIG. 8 is a side view of the second selectively removable adapter portion and second interlockable collar portion of a preferred embodiment the present invention.
Figure 9:
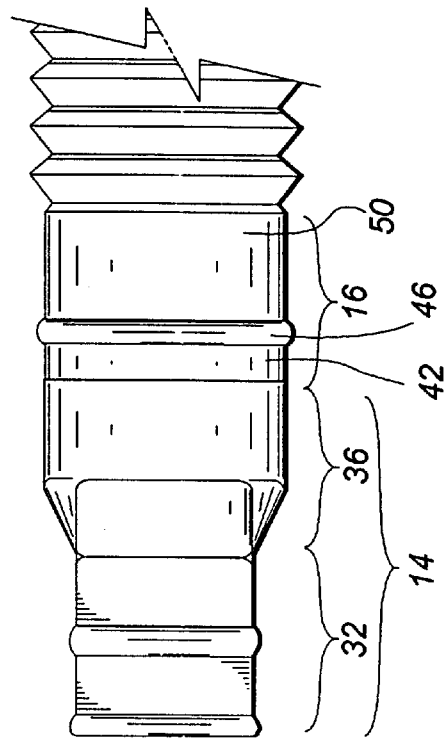
FIG. 9 is a side view of the first selectively removable adapter portion and first interlockable collar portion of a preferred embodiment of the present invention.

Referring now to FIG. 8, a detailed side view of the second selectively removable adapter portion 22 and the second interlockable collar portion 20 is shown. FIG. 9 shows a detailed side view of the first selectively removable adapter portion 14 and the first interlockable collar portion 16. As shown in FIGS. 8 and 9, the first selectively removable adapter portion 14 is larger than the second selectively removable adapter portion 22. Also, the first interlockable collar portion 16 has a slightly larger cross-sectional radius than the second interlockable collar portion 20. As previously mentioned, the first selectively removable adapter portion 14 is of a different size than the second selectively removable adapter portion 22 so that first rectangular gutter adapter portion 32 will fit around a standard downspout of one size and second rectangular gutter adapter portion 34 will fit around a standard downspout of a smaller size. Another reason for the different-sized selectively removable adapter portions, 14 and 22, is so that the first selectively removable adapter portion 14 of a first downspout extension can be connected to the second selectively removable adapter portion 22 of a second downspout extension to form a downspout extension assembly. However, the preferred method of connecting two downspout extensions 10 to form a downspout extension assembly is to remove the selectively removable adapter portions, 14 and 22, as will be discussed below in reference to FIGS. 10A–10D.

Figure 10A:
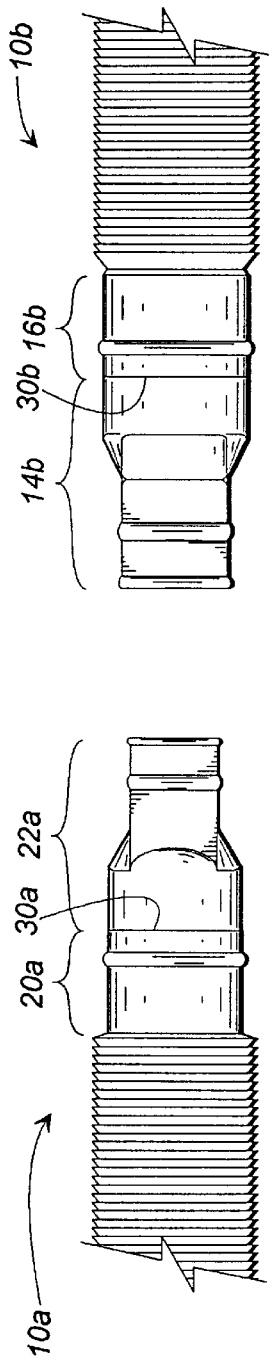
FIG. 10A is a side view of a first downspout extension, 10a, and a second downspout extension, 10b.

Referring now to FIG. 10A, the second selectively removable adapter portion 22a and second collar portion 20a of downspout extension 10a is shown. The first selectively removable adapter portion 14b and first collar portion 16b of downspout extension 10b is also shown in FIG. 10A.

Figure 10B:
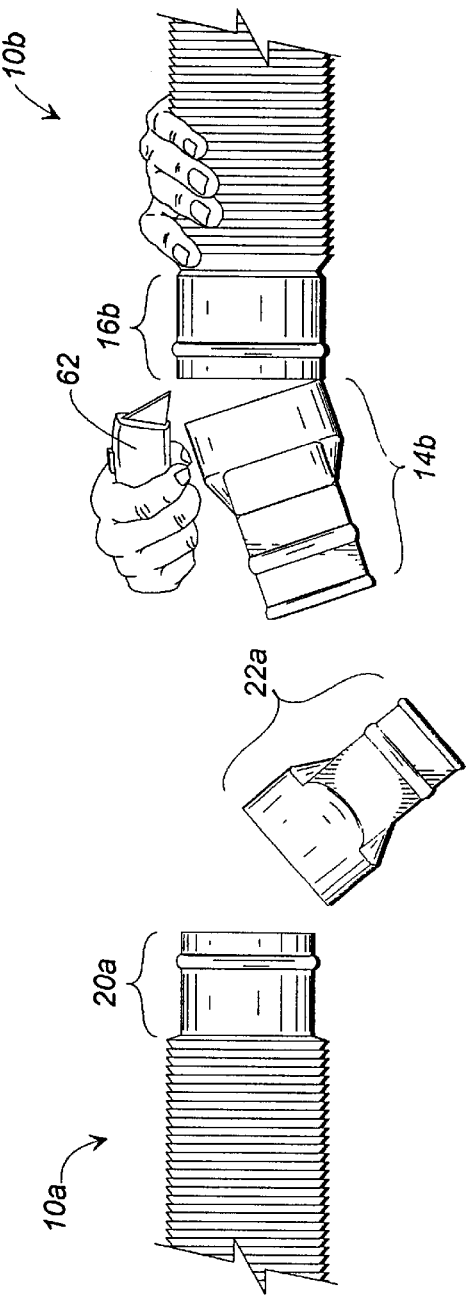
FIG. 10B is a side view in which the second selectively removable adapter portion, 22a, of downspout extension, 10a, has been cut off at the cut line, 30a, and the first selectively removable adapter portion, 14b, of downspout extension, 10b, is in the process of being cut off at the cut line, 30b.

To form a downspout extension assembly, the selectively removable adapter portions, 22a and 14b, are removed from downspout extensions, 10a and 10b, respectively as shown in FIG. 10B. Preferably this is done by using an appropriate cutting tool along the cutlines 30a and 30b. The thin cross-sectional thickness of the cutlines 30a and 30b facilitates the removal of the selectively removable adapter portions, 22a and 14b. As shown in FIG. 10B, a razor blade 62 can be used to remove the selectively removable adapter portions, 22a and 14b. However, other appropriate cutting tools, such as knives, saws, etc. can be used to remove the selectively removable adapter portions, 22a and 14b.

Referring now to FIG. 10C, the first collar portion 16b and second collar portion 20a are connected together by slipping the larger first collar portion 16b around the smaller second collar portion 20a until male locking rib 48a locks into female locking rib 46b. This completes the connection of downspout extension 10a and 10b to form a downspout extension 12 such as is shown in side cross-sectional view in FIG. 10D.

Referring to FIG. 10D, the first outer collar 42b surrounds the second inner collar 52a. The female locking rib 46b surrounds the male locking rib 48a. The first inner collar 50b surrounds the second outer collar 44a. The raised male locking rib 48a prevents the first outer collar 42b and first inner collar 50b from moving axially away from or towards downspout extension 10a. Thus, downspout extension 10a and 10b are held together. To disconnect the downspout extensions, 10a and 10b, the downspout extensions are pulled apart using axial force until the locking ribs 46b and 48a unlock from each other. Also, the plastic second collar portion 20a can be squeezed slightly to reduce the diameter of the second collar portion 20a and the second collar portion 20a can be slid out of the first collar portion 16b.

It should be noted that any number of downspout extensions 10 can be connected in the manner described above to form a downspout extension assembly of whatever length is required by the user.

The downspout extension 10 is preferably formed by the following process. A plastic liquid is extruded into a generally cylindrical die. Before the plastic sets, a mold corresponding to the shape of the downspout extension 10 clamps around the extruded cylindrical piece and stamps out the downspout extension 10. Thus, preferably, the downspout extension 10 is extruded as one piece of plastic.

It will now be appreciated that the preferred embodiment of the present invention includes an elongate, generally cylindrical body having first and second ends that comprises a first selectively removable adapter portion at the first end and that extends to a first cut line. The generally cylindrical body also includes a first interlockable collar portion axially interior to the first cut line and an adjustable portion between the first interlockable collar portion and a second interlockable collar portion. The body further includes a second interlockable collar portion that extends from the adjustable portion to a second cut line. Finally, the cylindrical body includes a second selectively removable adapter portion at the second end of the cylindrical body and adjacent to the second cut line.

Given the foregoing disclosure of the preferred embodiment and design parameters for the present invention, other embodiments of the present invention will suggest themselves to those skilled in the art. Therefore, the scope of the present invention is to be limited only by the claims below.

What is claimed is:

1. An integrally molded, repositionable gutter downspout extension in combination with a gutter downspout, said gutter downspout having a rectangular cross-sectional end, the downspout extension for connection to the rectangular cross-sectional discharge end of the gutter downspout, the downspout extension comprising:

an elongate generally cylindrical body having first and second ends, said body comprising a plurality of collapsible corrugations, said collapsible corrugations comprising lockable annular members, each said lockable annular member comprising a static side and a movable side, that allow said body to extend, contract, bend, and lock into selectable lengths and angular positions; and first and second downspout connectors affixed at said first and second ends, respectively, said first and second downspout connectors being generally rectangular in cross-section whereby the extension can be connected to said discharge end of said gutter downspout.

2. The repositionable gutter downspout extension of claim 1, further comprising a first transition region between said first downspout connector and said first end and a second transition region between said second downspout connector and said second end, wherein said transition regions have a generally rectangular cross-section adjacent said downspout connectors and transition in cross section to a generally circular cross-section.

3. The repositionable gutter downspout extension of claim 1, wherein said first downspout connector has a larger cross-sectional area than the cross-sectional area of said second downspout connector.

4. The repositionable gutter downspout extension of claim 1, wherein said first downspout connector has a larger cross-sectional area than the cross-sectional area of said second downspout connector, whereby said first downspout connector of a first downspout extension can be connected to a second downspout connector of a second downspout extension to form a downspout extension assembly.

5. The repositionable gutter downspout extension of claim 1, wherein said body further comprises a male locking rib at said first end and a female locking rib at said second end, said male locking rib and female locking rib each comprising a protuberance that extends circumferentially around said body, said protuberance having a radius greater than the radius of said body;

whereby the first end of a first downspout extension can be fixably held to a second end of a second downspout extension.

6. The repositionable gutter downspout extension of claim 1, wherein said first end and said second end of said body have circular cross-sections, and wherein said circular cross-section of said first end has a smaller radius than a radius of said circular cross-section at said second end, wherein said connectors at said first and second ends are removable; and whereby a first downspout connector of a first downspout extension and a second downspout connector of a second downspout extension can be removed, whereby the first end of the first downspout extension can be connected to the second end of the second downspout extension to form a downspout extension assembly.

7. An integrally molded, repositionable gutter downspout extension in combination with a gutter downspout, said gutter downspout having a rectangular cross-sectional end, the downspout extension for connection to the discharge end of the rectangular cross-sectional end of the gutter downspout, the downspout extension comprising:

an elongate generally cylindrical body with first and second ends, said body including a plurality of collapsible, extendible, and lockable corrugations, and connectors of rectangular cross section affixed at said first and second ends for connection to the rectangular gutter downspout, whereby the extension may be extended, contracted, bent, and locked into selectable lengths and angular positions.

8. The repositionable gutter downspout extension of claim 7, further comprising transition regions at said ends of said body from a cylindrical cross section of said body to the rectangular cross section of said connectors.

9. The repositionable gutter downspout extension of claim 7, wherein said collapsible corrugations comprise static sides and movable sides;

whereby the downspout extension can be extended by manually pulling the movable sides away from the static sides until the movable sides lock into position, and whereby the downspout extension can be compressed by pushing the movable sides towards the static sides until the movable sides lock into position.

10. The repositionable downspout extension of claim 7, further comprising locking means comprising a female locking rib at said first end of said body and a male locking rib at said second end of said body, said female locking rib and male locking rib each comprising a curved protuberance extending circumferentially around said body, said protuberance having a radius greater than the radius of said body, said protuberance of said female locking rib having a radius greater than said protuberance of said male locking rib.

11. The repositionable downspout extension of claim 8, wherein said cross-section of said connector at said first end is larger than said cross-section of said connector at said second end;

whereby the first end of a first downspout extension can be connected to the second end of a second downspout extension to form a downspout extension assembly.

12. The repositionable downspout extension of claim 7, wherein said cross-section of said connector at said first end is larger than said cross-section of said connector at said second end; and further comprising locking means comprising a female locking rib axially interior to said first end of said body and a male locking rib axially interior to said second end of said body, said female locking rib and male locking rib each comprising a curved protuberance extending circumferentially around said body, said protuberance having a radius greater than the radius of said body, said protuberance at said female locking rib having a radius greater than said protuberance of said male locking rib;

whereby the first end of a first downspout extension can be connected to the second end of a second downspout extension after removal of said connectors to form a downspout extension assembly, and whereby the female locking rib of the first downspout extension and the male locking rib of the second downspout extension are in frictional contact with each other and prevent the first downspout extension and second downspout extension from moving relative to each other.

13. The repositionable downspout extension of claim 7, wherein said first end and said second end of said body have circular cross-sections, and wherein said circular cross-section of said first end has a smaller radius than a radius of said circular cross-section at said second end; and wherein said connectors at said first and second ends are removable;

whereby the connector at a first end of a first downspout extension and the connector at a second end of a second downspout extension can be removed, whereby the first end of the first downspout extension can be connected to the second end of the second downspout extension to form a downspout extension assembly.

14. The repositionable downspout extension of claim 7, wherein said first end and said second end of said body have circular cross-sections, and wherein said circular cross-section of said first end has a larger radius than a radius of said circular cross-section at said second end;

further comprising locking means comprising a female locking rib axially interior to said first end of said body and a male locking rib axially interior to said second end of said body, said female locking rib and male locking rib each comprising a curved protuberance extending circumferentially around said body, said protuberance having a radius greater than the radius of said body, said protuberance of said female locking rib having a radius greater than said protuberance of said male locking rib;

wherein said connectors at said first and second ends are removable;

whereby the connector at a first end of a first downspout extension and the connector at a second end of a second downspout extension can be removed, whereby the first end of the first downspout extension can be connected to the second end of the second downspout extension to form a downspout extension assembly; and whereby the female locking rib of the first downspout extension and the male locking rib of the second downspout extension are in frictional contact with each other and prevent the first downspout extension and second downspout extension from moving relative to each other.

* * * * *